(12) United States Patent
Helsel et al.

(10) Patent No.: US 6,735,027 B2
(45) Date of Patent: May 11, 2004

(54) HEAD FLY HEIGHT BY USING THE APPLIED PEAK AREA RATIO TO DETERMINE SIGNAL PW50

(75) Inventors: Dave Helsel, Fullerton, CA (US); James Aralis, Mission Viejo, CA (US); Dino J. Pollalis, Newport Beach, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/089,053

(22) Filed: Jun. 2, 1998

(65) Prior Publication Data

US 2001/0050826 A1 Dec. 13, 2001

(51) Int. Cl.$^7$ .......................... G11B 27/36; G11B 21/02
(52) U.S. Cl. ............................ 360/31; 360/75
(58) Field of Search ............... 360/75, 31, 25, 360/250, 254

(56) References Cited

U.S. PATENT DOCUMENTS

| 5,483,393 A | | 1/1996 | Mento et al. ............ 360/77.08 |
| 5,610,784 A | | 3/1997 | Dorius et al. ............... 360/103 |
| 5,687,042 A | | 11/1997 | Chhabra et al. ............ 360/103 |
| 5,750,270 A | * | 5/1998 | Tang et al. ................. 428/611 |
| 5,991,113 A | * | 11/1999 | Meyer et al. .................. 360/75 |

* cited by examiner

Primary Examiner—Andrew L. Sniezek
(74) Attorney, Agent, or Firm—W. Daniel Swayze, Jr.; W. James Brady; Frederick J. Telecky, Jr.

(57) ABSTRACT

The present invention includes a circuit and method for determining fly height based upon the PW50. A signal is used to provide a measure of PW50 by detecting the peak height and the area of the signal. The ratio of the peak height and area provides an indication of PW50 and correspondingly, the fly height.

6 Claims, 2 Drawing Sheets

HEAD FLY HEIGHT BY USING THE APPLIED PEAK AREA RATIO TO DETERMINE SIGNAL PW50

FIELD OF THE INVENTION

The present invention relates generally to heads for use in a magnetic storage disk drive, and more particularly to a method and apparatus for detecting and controlling head fly height and signal PW50.

BACKGROUND OF THE INVENTION

Conventional magnetic storage devices include a magnetic transducer, or "head" suspended in close proximity to a recording medium, for example a magnetic disk having a plurality of concentric tracks. The transducer is supported by an air bearing slider mounted to a flexible suspension. The suspension, in turn, is attached to a positioning actuator. During normal operation, relative motion is provided between the head and the recording medium as the actuator dynamically positions the head over the desired track. The relative movement provides an air flow along the surface of the slider facing the medium, creating a lifting force. The lifting force is counter balanced by a pre-determined suspension load so that the slider is supported on a cushion of air. Air flow enters the "leading end" of the slider and exits from the "trailing end". The head resides at the trailing end which tends to dip closer to the recording surface than the leading end.

As discussed above, the sliders ride on a cushion of air generated by the rotation of the magnetic disk. The upward force on the slider provided by this air cushion is directly proportional to the rotational velocity and as a consequence varies from the inner disk diameter (ID) to the outer disk diameter (OD). Since the sliders tend to be sensitive to changes in the upward force, the fly height will vary across the disk. Surface defects will also cause the head to "fly high". This is the most important error condition.

The recording medium includes information encoded in the form of magnetic transitions. The information capacity or areal density of the medium is determined by the transducer's ability to sense and write distinguishable transitions. An important factor affecting areal density is the distance between the head and the recording surface referred to as "fly height". It is desirable to fly the transducer very close to the media to enhance transition detection without permitting transducer contact with the medium surface. Some fly height stability is achieved with proper suspension loading and by shaping the air bearing slider surface (ABS) for desirable servo dynamic characteristics.

Another important factor affecting fly height is the slider's resistance to changing conditions. The air bearing slider is subject to a variety of changing external conditions during normal operation. Changing conditions affecting fly height include for example, change in relative air speed and direction and variation in temperature. If the transducer fly height does not stay constant during changing conditions, the data transfer between the transducer and the recording medium may be adversely affected.

Fly height is further affected by physical characteristics of the slider such as the shape of the ABS. Careful rail shaping, for example, will provide some resistance to changes in air flow. Another physical characteristic often found in conventional sliders is curvature along the length of the ABS from leading end to the trailing end. This curvature is referred to as "crown" and may be either concave or convex with respect to the ABS. Crown variation is generally one of two types namely, process variation or temperature variation.

However, it has been determined that it may be difficult to anticipate all of the factors which affect "fly height", and consequently, some variations in the fly height result randomly. These variations should be identified when they occur because if the fly height is too large, the result is that information is not being recorded properly on the media. This condition may make it necessary to return the write head to the same location and rewrite the information.

FIG. 1 illustrates a circuit of the prior art. In this circuit, two filters are connected in parallel. These filters maybe a 10 pole band pass filter. The filter 100 may have a band pass frequency of F while the filter 102 has a band pass frequency of frequency 3F. The filter 100 filters out everything but the first harmonic of the input signal, and the filter 102 filters out everything but the third harmonic of the input signal. The output of filter 100 is connected to a peak detector circuit 104 to detect the peaks from the output of the filter 100. Additionally, a peak detector circuit 106 is connected to the output of filter 102. The peak detector circuit 106 detects the peak signal from the filter 102. The output of the peak detector circuit 104 and the output from the peak detector circuit 106 are connected to a dividing circuit 108 to divide the outputs from peak detectors 104 and 106. The problem with this circuit is that it is complex and difficult to implement. A circuit is required that provides accurate indication of fly height and is easy to implement.

SUMMARY OF THE INVENTION

The present invention determines fly height by sensing changes in the PW50 of a pulse being output from the head of a disk drive system. PW50 is essentially an indication of the sharpness of the head output signal. The present invention senses changes in the degree of sharpness of this signal as an indication of the height of the head flying over the surface of the disk drive. The signal sharpness (or PW50) of the signal is determined from the ratio of the amplitude of the peak signal and the area under the curve of the signal. This ratio is an indication of fly height. The present invention eliminates the need to employ band pass filters to filter the first harmonic and the third harmonic. The present invention determines the PW50, which is a measure of the pulse width at 50% of the peak amplitude, from the input signal. The present invention uses a peak detector in parallel with a full wave rectifier and integration circuit to determine the ratio which is an indication of the head fly height.

DETAILED DESCRIPTION OF THE INVENTION

PW50 is defined as the width of a pulse at a point half way between its peak and its base. This point is illustrated in FIG.

Figure 3:
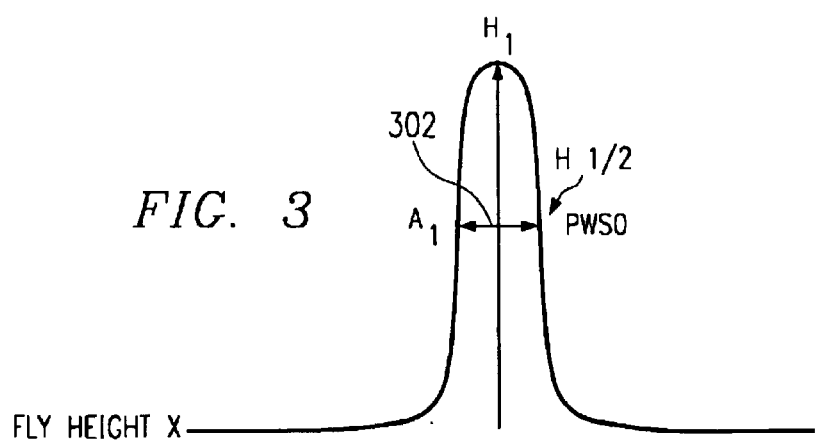
FIG. 3 illustrates a relation between the PW50 with a relatively sharp pulse.
Figure 4:
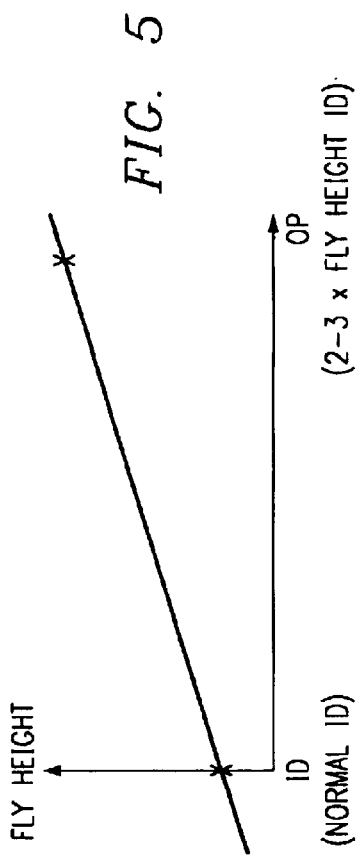
FIG. 4 illustrates a relation between the PW50 with a relatively wide pulse.

3 as element 302 for the pulse A. Typically, the higher the head is flying off the surface of the media in a disk drive system, the pulses that are output from the head are wider. That is, the signal PW50 is greater. When the head is just sufficiently off the surface to read the disk, a relatively narrow pulse is output from the head as illustrated in FIG. 3. Correspondingly, the PW50 is relatively small. However, as the flying height of the head from the disk surface increases, the pulses output from the head become wider such as illustrated in FIG. 4, and the PW50 becomes significantly greater. Thus, signal PW50 affords a good indication of the actual fly height.

FIG. 3 and FIG. 4 illustrate two examples of a narrow pulse and a wide pulse respectively. Depending on the fly height, the relative width would vary. In theory, there are an infinite number of pulses with widths between the two illustrated.

There are many ways for implementing a circuit to determine fly height based upon PW50. If H1 represents the amplitude of the pulse in FIG. 3 and A1 represents the area of the pulse then $$\frac{H_1}{A_1}$$

represents a measure of the PW50. Likewise with FIG. 4, if H2 represents the amplitude of the pulse and A2 represents the area of the pulse then $$\frac{H_2}{A_2}$$

represents a measure of the PW50. With the condition, $$\frac{H_1}{A_1} > \frac{H_2}{A_2}$$

the head is closer to the disk at position 1 than at position 2.

Figure 6:
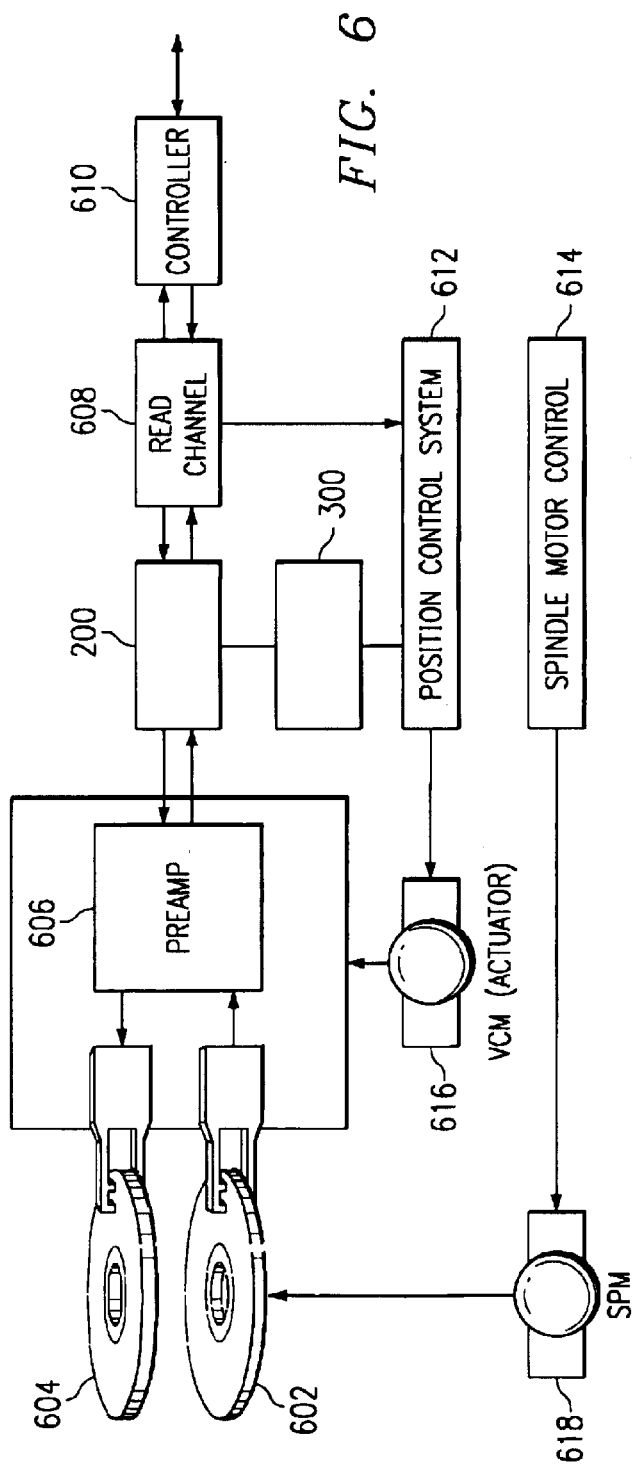
FIG. 6 illustrates a system diagram of the present invention.

FIG. 6 illustrates a system diagram of the present invention. Magnetic disk 602 is rotated by spindle motor 618. A head 604 reads and writes data transitions and reads servo transitions on the magnetic disk 602. The transitions are input to a preamplifier 606 which amplifies the signal from the head 604. The amplified servo transition signal is input to the fly height detector 200. The output of the fly height detector circuit 200 is input into a don't write data control circuit 300 which holds off writing data until the head fly height returns to normal. Then the head 604 may write or rewrite the data information on a given track. The read channel 608 converts the analog pulses to digital pulses and obtains timing and position information from the recorded transitions. This information is transmitted to the position control system 612, which in turn controls the voice coil motor 616 to move the heads so that the heads are positioned at the desired track. The read channel 608 is connected to the controller 610 which prepares information to be placed on the bus as well as to interface with the host computer. Additionally, the spindle motor control 614 controls the spindle motor 618 to rotate the disk at a proper speed.

Figure 1:
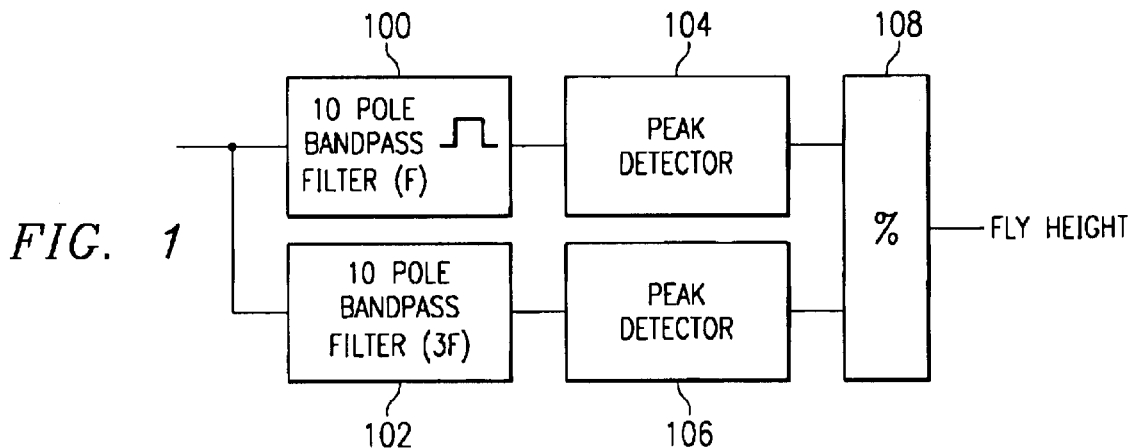
FIG. 1 illustrates a fly height detection circuit.
Figure 2:
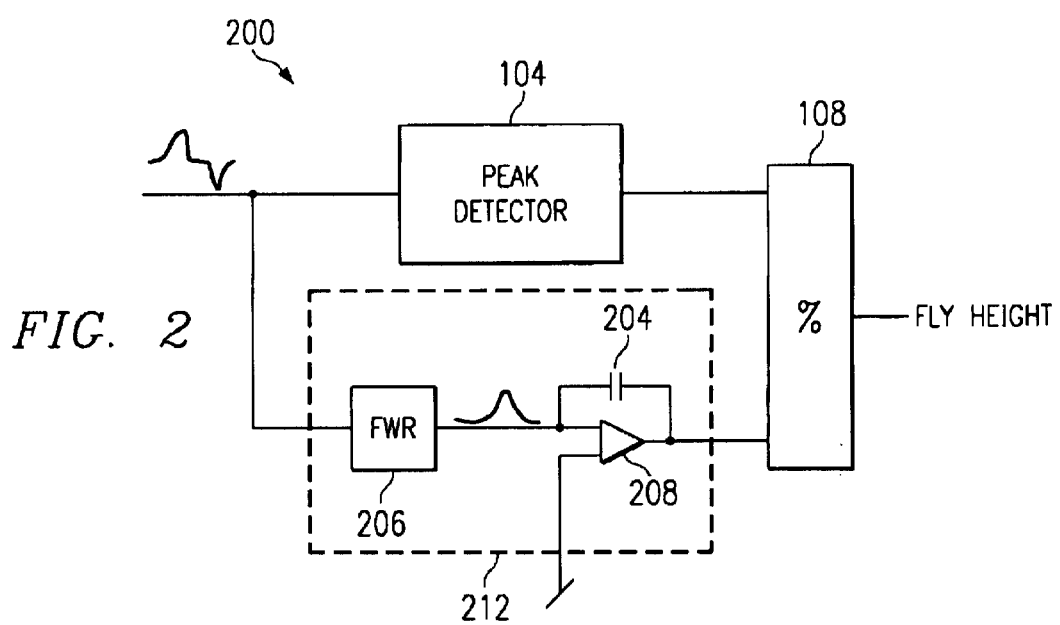
FIG. 2 illustrates a fly height detection circuit of the present invention.

FIG. 2 illustrates one circuit to determine fly height. The signal from the head is input to the peak detector 202 and the full wave rectifier 206. The peak detector 202 determines the magnitude of the peak of the input signal and consequently provides the signal for H. Thus, the signal H is output from peak detector circuit 202 and is input to division circuit 210. This signal H corresponds to the amplitude of the input signal. Additionally, the signal from the head is input to a full wave rectifier circuit 206. The full wave rectifier 206 rectifies the input signal from the head. A rectified signal is output from the full wave rectifier 206 and input to the operational amplifier 208. A capacitor 204 is connected between the output of the full wave rectifier 206 and the output of the operational amplifier 208. The area detector circuit 212 outputs a signal A indicating the area under the curve of the rectified input signal. The output signal, signal A, from the operational amplifier 208 is input to the division circuit 210. The division circuit 210 divides the height signal H, output from the peak detector circuit 202, and signal A representing the area and output from the area detection circuit 212 to output a fly height signal which indicates the fly height.

Figure 5:
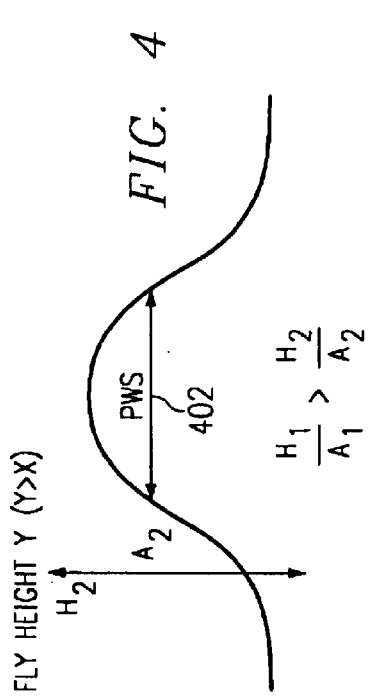
FIG. 5 illustrates a relation between fly height and radial displacement.

FIG. 5 illustrates the changing of PW50 from the inside diameter to the outside diameter. This change in PW50 is due to many factors however, one of these factor is the increased speed of the head, relative to the media, at the outer diameter. This increased speed increases the force which lifts the head over the disk. As illustrated in FIG. 6, the output of the fly height detection circuit 200 is input to a control circuit 300 which may be a DSP, to determine if the fly height has exceeded a predetermined level or threshold depending on the ID to OD position. If this predetermined level or threshold has been exceeded, there is danger that the information has not been or will not be written properly on the disk, and the control circuit 300 generates the necessary control signals to require this system 400 to rewrite the same location. During the rewrite, the fly height should be of the proper height however, it is again determined and an additional rewrite can be scheduled if required.

What is claimed is:

1. A circuit for detecting fly height, comprising:
   a circuit for reading with a head a transition signal previously recorded on a disk;
   a circuit for measuring the fly height of said head from said disk based on a PW-50 signal determined from said transition signal; and
   a circuit to determine if a threshold height has been reached based on said fly height, said threshold height varying in accordance with a radial position over said disk.

2. A circuit for detecting fly height as in claim 1, wherein said PW-50 signal corresponds to area of said transition signal.

3. A circuit for detecting fly height as in claim 1, wherein said PW-50 signal corresponds to peak height of said transition signal.

4. A method for detecting fly height, comprising the steps of:
   reading with a head a transition signal previously recorded on a disk;
   measuring the fly height of said head from said disk based on a PW-50 signal determined from said transition signal; and
   determining if a threshold height has been reached based on said fly height and said threshold height being based on a radial position of said disk.

5. A method for detecting fly height as in claim 4, wherein said PW-50 signal corresponds to area of said transition signal.

6. A method for detecting fly height as in claim 4, wherein said PW-50 signal corresponds to peak height of said transition signal.

* * * * *